Figure 1:
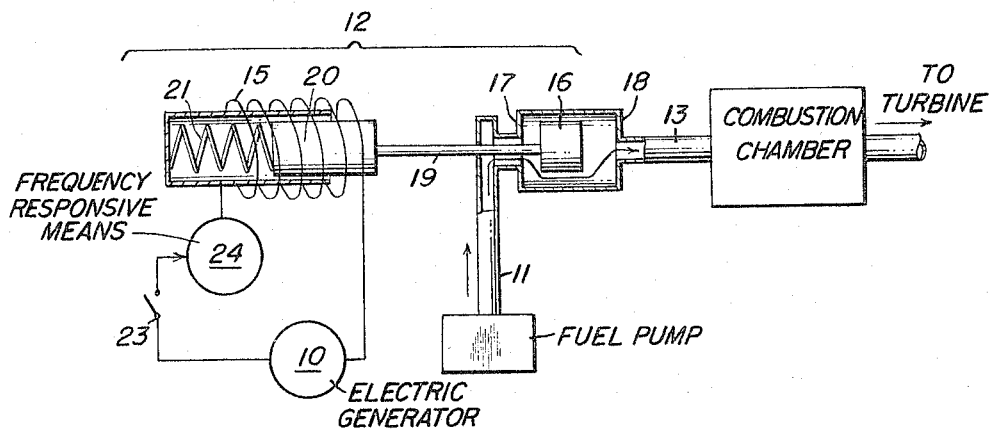

Dec. 6, 1966  U. OPRECHT  3,289,403
ELECTRONICALLY CONTROLLED REGULATING
DEVICE FOR GAS TURBINES
Filed Nov. 4, 1964

INVENTOR
ULRICH OPRECHT

United States Patent Office 3,289,403
Patented Dec. 6, 1966

3,289,403
ELECTRONICALLY CONTROLLED REGULATING
DEVICE FOR GAS TURBINES
Ulrich Oprecht, Wittenbach, St. Gall, Switzerland, assignor to Adolph Saurer Ltd., Arbon, Switzerland
Filed Nov. 4, 1964, Ser. No. 409,011
Claims priority, application Switzerland, Jan. 29, 1962, 1,070/62
1 Claim. (Cl. 60—39.28)

This application is a continuation-in-part of my copending application Serial No. 254,326, filed January 28, 1963, now Patent No. 3,220,184, and entitled: "Regulating Device for Gas Turbines."

The aforenoted parent application relates to a regulating device for controlling the number of revolutions of gas turbine power plants driven with liquid fuel wherein the main shaft of the gas turbine drives a fuel pump as well as an electric generator, and an electromagnetic regulating valve controlling the fuel supply to the combustion chamber of the gas turbine is so connected with said generator that the field coil of the regulating valve and the generator form a closed electric circuit. The regulating valve comprises a control piston influenced by a tension spring as well as by said field coil, and two mutually spaced control faces, the control piston being arranged for back and forth displacement between these control faces. When the number of revolutions of the turbine rises and the load on the spring increases, the control piston is displaced toward the first of said control faces, and the resulting narrowing of the gap between the first control face and the near face of the piston effects a throttling of the fuel supply to the combustion chamber of the gas turbine such that the excessive number of revolutions is reduced. A complete closing of the gap between the first control face and the adjacent face of the control piston is avoided by the appropriate selection of the characteristics of the tension spring influencing the control piston, which, while permitting a narrowing of the gap between the first control face and the near face of the piston, does not permit the piston to approach to the point of abutting relationship with the first control face. When the electric circuit is interrupted, however, the control piston, under the influence of the tension spring, is displaced in a direction opposite to that traveled in the course of throttling the fuel supply, until it abuts against the second control face and thereby, closes the passage for the fuel supply and brings the turbine to a standstill. Viewed in more specific detail, the regulating valve disclosed and claimed in the parent application includes, in addition to a control piston arranged for reciprocation between two contact faces, an armature connected with the piston, a field coil surrounding this armature, and a tension spring abutting against the armature. The armature is provided hollow to accommodate in its interior, a damping body influenced by a spring and arranged for longitudinal displacement in the interior of the armature. The electric circuit includes a rheostat variable at will, as well as a switch provided between the generator and the field coil and adapted to break the connection therebetween.

The variable resistance permits to adjust the desired number of revolutions over the entire operational range of the gas turbine. For an operation of the gas turbine when the number of revolutions varies widely and the number of revolutions required at any given time, therefore, calls for continuous manual control, as in a vehicle drive, the arrangement disclosed in the parent application is very simple and stable and hence, very advantageous. Deviations from the desired value, due, e.g., to variations of the resistance of the field coil brought about the temperature changes, or to relative displacement of control piston and control faces caused by differences in thermal expansion in response to temperature changes encountered during operation of the turbine, can be compensated for simply and effectively by a mere adjustment of the rheostat.

In cases, however, where a predetermined number of revolutions is to be maintained permanently within precisely prescribed limits, as in the drive of an electric generator, the use of a rheostat variable at will, is rendered somewhat less satisfactory.

It is an object of the present invention to provide a regulating device for gas turbines driven by means of liquid fuel, which is particularly adapted for continuously maintaining a predetermined number of revolutions, within precisely prescribed limits.

Other objects and the manner in which the same are attained, will become apparent as this specification proceeds.

The present invention contemplates to expand the concept of the parent application by the inclusion, in the electric circuit for the generator and the field coil of the electromagnetic regulating valve, of a frequency responsive adjustable electronic control device inserted in the circuit between the generator and the field coil. This electronic control device may be supplied either directly with current from the generator, or else from an extraneous current source such as a direct current battery.

In the drawing accompanying this specification and forming part thereof, two embodiments of the invention are illustrated diagrammatically by way of example.

Figure 2:
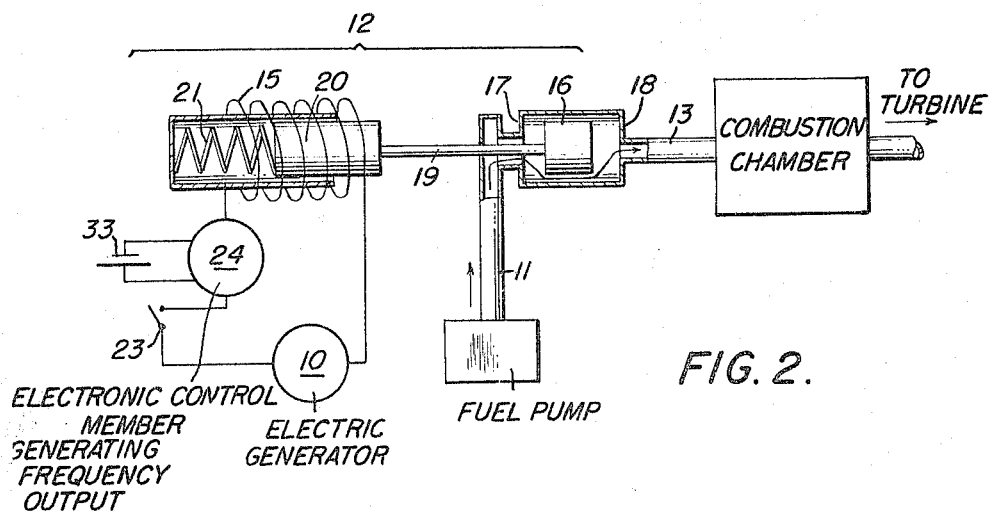

In the drawing:

FIG. 1 shows quite schematically, a regulating device incorporating a frequency responsive control member supplied with generator current, and FIG. 2 is a similar showing of a modification wherein the frequency responsive device is supplied from an extraneous current source.

Referring to the drawing wherein like elements are denoted by identical reference numerals, the regulating valve generally indicated at 12 is seen to control the passage of fuel from a fuel pump (not shown) and conduit 11, to a conduit 13 and the combustion chamber of the gas turbine (not shown in the drawing). As shown in greater detail in the parent application, the fuel is injected into the combustion chamber through a nozzle, to be converted in such chamber into working medium for the gas turbine in a manner well known in the art. The regulating valve 12 controls the amount of fuel conveyed by the fuel pump and supplied to the combustion chamber. The regulating valve comprises an armature 20 arranged for displacement relative to a magnetic field coil 15, and a control piston 16 disposed for reciprocation between control faces 17 and 18. Piston 16 is rigidly connected, by means of a rod 19, with armature 20, this armature being influenced by a tension spring 21. The characteristics of spring 21 are so selected that control piston 16, while free to approach control face 17 whereby to throttle the fuel supply, is prevented from being displaced into abutting relationship with control face 17. A generator 10 is connected with field coil 15 to form a closed electric circuit which in addition to a switch 23, also includes, disposed between the generator and the field coil, a frequency responsive adjustable electronic control member 24.

In accordance with the present invention, this frequency responsive electronic control member 24 is provided for the purpose of continuously comparing the instantaneous frequency of the generator with a predetermined desired value and to transform any deviations of the instantaneous generator frequency from the given norm, into changes of resistance which in turn, via field coil 15, are translated into displacements of control piston 16 such that the regulating valve 12 adjusts the amount of fuel admitted to the combustion chamber in the sense of restoration of the desired value of the frequency of the generator. The frequency responsive electronic control member may comprise, for example, a filter chain, the transmission factors of which in the predetermined operational range, deviate materially from the transmission factors outside such range The changes in transmission factors result in corresponding changes in the current supplied to the regulating valve, in the sense that a number of revolutions inferior to the desired value reduces the current, and a number of revolutions exceeding the desired value increases the current.

As shown in FIG. 1, the frequency responsive electronic control member 24 may be supplied with current from the generator.

In accordance with the modified embodiment of the invention illustrated in FIG. 2, the frequency responsive electronic control member 24 may be supplied with current from an extraneous source, e.g. a direct current battery 33.

I wish it to be understood that I do not desire to be limited to the details of construction, design and operation shown and described, as modifications within the scope of the appended claim and involving no departure from the spirit of the invention nor any sacrifice of the advantages thereof, may occur to persons skilled in the art.

I claim:

In combination, a regulating device for a gas turbine having a fuel pump, a combustion chamber and an electric generator driven by the turbine, said regulating device consisting of: a valve for adjusting the flow of liquid fuel in an inlet line from said pump to an outlet line to the combustion chamber, said valve including a chamber, a piston displaceable in said chamber and a piston rod connected to the back of said piston which projects out of said chamber; an armature connected to the end of said rod, said armature, rod and piston all being aligned with the outlet line; a sleeve maintained in fixed position which encases the rear portion of said armature; a tension spring fixed at one end to said sleeve and at its other end to said armature; a field coil wound about said sleeve; a closed circuit including said field coil and said electric generator; a signal generator in said closed circuit between said electric generator and said field coil; a direct current battery source feeding said signal generator; said valve chamber providing two spaced apart and parallel control faces which define the respective fixed limits of movement of said control piston; the increase in the speed of the electric generator increasing spring tension by solenoid action to displace the piston towards said control face adjacent the inlet line to thereby reduce the fuel flow into the valve, and the decrease in the speed of the electric generator decreasing spring tension by solenoid action to displace the piston towards the other control face adjacent the outlet to thereby increase the fuel flow; said direct current battery source independently energizing said signal generator to preset the electrically energized spring loading in said sleeve and thereby provide effective lateral control of the movement of the piston, rod and armature assembly as a unit; and a switch in said circuit for disconnecting solenoid operation.

References Cited by the Examiner

UNITED STATES PATENTS

| | | | |
|---|---|---|---|
| 1,201,128 | 10/1916 | Wirth | 251—211 X |
| 2,977,756 | 4/1961 | Stone | 60—39.28 |
| 3,164,769 | 1/1965 | Anderson | 322—32 |

FOREIGN PATENTS 899,297　12/1953　Germany.

JULIUS E. WEST, *Primary Examiner.*

MARK NEWMAN, *Examiner.*